United States Patent Office 3,830,790
Patented Aug. 20, 1974

3,830,790
SEPARATION AND PURIFICATION OF
KALLIKREIN-TRYPSIN INHIBITOR
Erich Rauenbusch, and Christian Golker, Wuppertal-Elberfeld, Germany, assignors to Farbenfabriken Bayer Aktiengesellschaft, Leverkusen, Germany
No Drawing. Filed Mar. 29, 1972, Ser. No. 239,315
Claims priority, application Germany, Apr. 3, 1971,
P 21 16 377.9
Int. Cl. C07c 103/52; C07g 7/00
U.S. Cl. 260—112.5
15 Claims

ABSTRACT OF THE DISCLOSURE

The present invention relates to processes for the separation and purification of kallikrein-trypsin inhibitor, otherwise known as kallikrein-inactivator, (KI) from aqueous mixtures which contain a multiplicity of different polypeptide impurities and other cell substances which comprises adsorbing the said kallikrein-trypsin inhibitor onto a non-ionic, porous, cross-linked resin copolymer of styrene and divinyl benzene, said resin having an active surface area of from 10 to 1000 square meters per gram (m.$^2$/g.), separating the remainder of said aqueous mixture from said resin and eluting said inhibitor from said resin.

FIELD OF THE INVENTION

The present invention relates to a process for the purification of kallikrein-trypsin inhibitor, and especially to the isolation of kallikrein-trypsin inhibitor from extracts of bovine organ tissue.

DESCRIPTION OF THE PRIOR ART

The kallikrein-trypsin inhibitor from bovine organs ("Trasylol") is a basic polypeptide of molecular weight 6500, the chemical structure of which has been established. [F. A. Anderer and S. Hornle, Z. Naturforsch, pt. b.20 457 (1965); F. A. Anderer, Z. Naturforsch. pt. b.20 462 (1965); F. A. Anderer and S. Hornle, J. Biolog. Chem. 241 1568 (1965).] It inhibits various proteases, of which the most important are kallikrein, trypsin, chymotrypsin and plasmin. The inhibitor has found broad therapeutic use especially in the form of an injectable preparation [R. Gross and G. Kroneberg, "Neu Aspekte der Trasylol-Therapie" ("New Aspects of Trasylol Therapy"), published by F. K. Schattauer, Stuttgart 1965].

Of course, its purity must meet very high standards for this purpose. To achieve this, the purification of the crude tissue extract has hitherto been carried out in several stages by means of specific precipitation reagents, such as sulphosalicylic acid, metaphosphoric acid, and trichloroacetic acid and finally by crystallization [German Patent Specifications 954,284, 1,084,433, 1,155,563, 1,181,371 and 1,193,200; F. Schultz Naturwiss, 54 338 (1967)]. Between these stages several desalination steps are necessary, which have been carried out with ion exchangers. In order to simplify this desalination and in order at the same time to achieve concentration of the extracts, the process of Gustafson [R. L. Gustafson (Rohm and Haas Company, Philadelphia), (German Pat. 1,274,128), Feb. 22, 1966] and Blessing, H. W. and La Roche de Benneville, P. (Rohm and Haas Company, Philadelphia), (DOS 2 040 107) was examined, who describe the removal of organic substances having hydrophobic ranges, such as wetting agents, bile acids, trypsin, polypeptides and others, from aqueous solution on porous polystyrene resins.

In the course of this work, it has now surprisingly been found that not only can the kallikrein-trypsin inhibitor be adsorbed from crude extracts of bovine organ tissue (for example, lungs) which contain a multiplicity of polypeptides and other cell substances, on certain, porous polystyrene resins of a large internal surface area, but that it can thereafter also be selectively eluted again. This makes it possible to achieve, in a single step, not only separation and concentration of the polypeptide from a dilute aqueous solution and removal of salts, but also extensive purification and removal of accompanying impurities. The process can be carried out both as chromatography in columns and batchwise in kettles.

It was not to be expected, even in the light of the process of German Pat. 1,274,128 and DOS 2 040 107, and is highly surprising, that it is possible, using the process according to the invention, to enrich and/or isolate kallikrein-trypsin inhibitor from a solution which contains numerous different polypeptides.

DESCRIPTION OF THE PRESENT INVENTION

Accordingly, the present invention now provides a process for the separation of kallikrein-trypsin inhibitor from an aqueous mixture, comprising adsorbing the said kallikrein-trypsin inhibitor on a non-ionic porous crosslinked resin copolymer of styrene and divinylbenzene having an active surface area of 10 to 1000 m.$^2$/g., separating the remainder of the mixture from the resin, and eluting the inhibitor from the resin.

A preferred form of the process of the invention is a process for the purification of the inhibitor in which the aqueous mixture is derived from an extract of bovine organ tissues.

Suitable polymers that may be used in the process of the invention are the porous copolymers of styrene and divinylbenzene described in Germain Offenlegungsschrift 1,745,717. In these copolymers the divinylbenzene is present as a crosslinking agent in an amount of 0.5 to 50 mol percent.

The solubility parameters $\delta$ of the inert materials used to produce the porosity lie within the limits indicated in German Patent schrift 1,274,128. The pore data of the resins suitable for use in accordance with the practice of the invention, therefore, do not differ from those displayed by the resins of German Pat. 1,274,128.

The solubility parameter $\delta$ is defined as the square root of the quotient of the energy of vaporization, $\Delta E$, and the molar volume V of the corresponding liquid:

$$\delta = (\Delta E/V)^{1/2}$$

the molar volume, V, is defined as follows:

$$V = \frac{\text{molar weight}}{\text{density}}$$

The energy of vaporization, $\Delta E$, is obtainable from the experimentally easily determinable heat of vaporization, $\Delta H$ (vaporization enthalpy), which differs from $\Delta E$ by the work; RT, required for the change in volume, as defined below:

$$\Delta E = \Delta H - RT$$

wherein R is equal to the gas constant and T is the absolute temperature measured in degrees Kelvin, (° K.). The values of $\Delta H$ given in the literature relate to a particular working temperature. Since the density is also required to calculate $\delta$, it is necessary to employ the value of the density which corresponds to the above working temperature.

The origin of the aqueous mixture from which the inhibitor is to be separated is important in obtaining best results from the process of the invention.

The aqueous mixture may, for example, originate from the process of the extraction of kallikrein inactivator described in German Patentschrift 1,084,433. In this process kallikrein-trypsin inhibitor is extracted from animal organs in a series of steps as follows:

(1) The inhibitor is extracted from the comminuted organs with an aqueous solution containing a salt or a hydroxide of an alkali metal or an alkaline earth metal, preferably calcium chloride, and an organic solvent, preferably methanol;

(2) The inhibitor is precipitated in the presence of an inert carrier by the addition of a ketone, preferably acetone;

(3) The inhibitor, adsorbed on the carrier, may then be dried;

(4) The inhibitor is taken up in water;

(5) The residual protein is precipitated by the addition of a precipitating agent from the aqueous solution; and (6) The solution of the inhibitor is freed from excess precipitating agent with ion exchange resins.

The process of the present invention is especially suited for the separation of kallikrein-trypsin inhibitor from extracts produced by the process described above as step (1).

If the organ tissue (for example, lung or parotid gland) is worked up in accordance with the above-described extraction process and the methanol or other organic solvent is completely removed from the extract, the extract can, after clarification, be used directly in the process of the invention. The specific activity is 70 to 90 KIU per mg. of solids.

However, if the digestion of the organ tissue is carried out in the presence of a carboxylic acid or mineral acid, then after clarification the adsorption of the inhibitor on the resin is incomplete. It is, however, improved by a suitable pretreatment of the crude extract, for example, by addition of a salt, such as ammonium sulphate, or by carrying out the digestion directly in the presence of ammonium sulphate. The adsorption of the inhibitor on the resin is improved by increasing the concentration of the salt, but as the upper limit the concentration at which precipitation of the inhibitor starts must not be exceeded. For ammonium sulphate, the most advantageous range is a saturation of 0.2–0.5 at a pH value of 1.0 to 2.5.

TABLE

[Adsorption of the Kallikrein-trypsin-inhibitor from crude solution onto porous polystyrene resins (The numbers Ca. 9221, Ca. 9255, Do 18/65 and Do 8/60 denote different copolymers of styrene and divinylbenzene.)]

| Resin type | Surface area, m.$^2$/g. | Amount of inhibitor adsorbed | |
|---|---|---|---|
| | | KIU/ml. of resin | Mg. of pure substance per ml. of resin |
| Ca. 9221 | 330 | 30,300 | 4.3 |
| Ca. 9255 | 150 | 21,000 | 3.0 |
| Do 18/65 | 115 | 23,000 | 3.3 |
| Do 8/60 | 70 | 3,800 | 0.54 |

The inhibitor is preferably adsorbed on the resin from an acid solution at a pH value of 1–3. In the neutral pH range, the adsorption is less complete; while good adsorption takes place in an alkaline medium, elution was rendered difficult.

After the inhibitor has been adsorbed, the resin is washed. This is preferably done with water, dilute aqueous mineral acid, and dilute aqueous salt solutions. Pure water, followed by 0.01 M hydrochloric acid and an 0.02 M solution of the Na salt of ethylenediaminetetraacetic acid, were also used with advantage. This permitted removal of accompanying impurities.

The inhibitor can be eluted from the resin with an aqueous water-miscible organic solvent (for example, methanol, ethanol, isopropanol and acetone). If the process is carried out in a column, the inhibitor can be eluted in a particularly pure form by allowing the concentration of the eluting organic solvent to rise slowly and fractionally collecting the eluate. Of course, it is also possible, as in the batch process, to elute the adsorbate with stepwise increases in the concentration of the organic solvent.

The concentration of eluant at which the kallikrein-trypsin inhibitor is eluted depends on the resin type and on the nature of the eluting solvent. If methanol is used, the inhibitor is eluted for example at 40–60% methanol, while in the case of isopropanol the greater part is eluted at only 20% isopropanol. Additives in the solvent can also modify the desorption behavior. Thus, an addition of ammonia brings about faster elution, but colored constituents are eluted at the same time.

The inhibitor may, however, be eluted with other eluants not containing an organic solvent; for example, triethylamine may be used.

The kallikrein-trypsin inhibitor obtained in this way is substantially free of other polypeptides and of salts, as can be shown by electrophoresis in polyacrylamide or on acetylcellulose strips. The specific activity is 3000–4000 KIU per mg. of solids. The yield obtainable is 60–80% of the inhibiting capacity of the crude extract, for a 30-fold to 40-fold enrichment.

The following examples illustrate the invention without limitation.

EXAMPLE 1

700 g. of bovine lungs freed of connective tissue and finely ground, were digested with aqueous methanol and calcium chloride in accordance with the process of German Patentschrift 1,084,433. The suspension was centrifuged off and concentrated to 275 ml. in a rotary evaporator in vacuo. The methanol must be removed completely. The pH of the solution was adjusted to 1.5 by adding 2 N hydrochloric acid; finally centrifugation was again effected. The supernatant liquid contained 880,000 KIU. This solution was charged onto the following column:

50 g. of porous polystyrene resin (Ca. 9221) of 330 m.$^2$ surface area per g. were taken up in methanol and washed until the methanol was practically free of substances which absorb in the UV (280 nm.). The methanol was thereafter decanted and replaced by boiled distilled water. The aqueous suspension of the resin (about 100 ml.) was introduced into a glass column of 3 cm. diameter and 30 cm. height, in such a way as to avoid air bubbles, and was washed with 200 ml. of water.

The crude extract containing inhibitor was charged onto the column at a throughput speed of 100 ml./hour. Thereafter the column was washed with 200 ml. of 0.01 M hydrochloric acid and subsequently with 200 ml. of 0.02 M sodium salt of ethylene diamine tetraacetic acid and 100 ml. of water. The inhibitor was thereafter eluted with a linear gradiant of 1 liter of water to 1 liter of 80% strength methanol and fractionally collected. The fractions containing inhibitor were combined, the methanol was evaporated off *in vacuo* and the aqueous solution was freeze-dried.

180 mg. of inhibitor containing 714,000 KIU were obtained, representing 81% of the inhibitory capacity originally introduced. The specific activity was 3,960 KIU/mg.

EXAMPLE 2

4 kg. of ground bovine lungs were stirred with 7.2 liters of distilled water. After stirring for 10 minutes, 350 ml. of 10% strength (v./v.) sulphuric acid were added until a pH value of 1.9 was reached. The mixture was made up to 12.0 liters, 200 ml. of toluene were added and the whole was stirred overnight at room temperature. The suspension was centrifuged for 10 minutes at 4800 revolutions per minute. Total activity in the supernatant liquid: $8.15 \times 10^6$ KIU. Ammonium sulphate was added over the course of 30 minutes, while stirring, until 0.45 saturation was reached. The pH value was adjusted to 1.5 with concentrated sulphuric acid, 320 g. of kieselguhr were added as a filtration aid, and the mixture was immediately filtered.

7.0 liters of this solution (total activity $4.38 \times 10^6$ KIU) were adsorbed on a column containing approximately 2 liters of of porous polystyrene resin of 150 m.$^2$ surface area per g. (Ca. 9255). The column was beforehand washed with 1 N methanolic HCl, methanol and water. After being charged with the extract, the column was washed with 4 liters of 0.01 N HCl, 4 liters of 0.02 M EDTA (sodium salt of ethylene diamine tetraacetic acid) and 2 liters of distilled water, and elution was subsequently carried out with a linear gradient of 5 liters of distilled water and 5 liters of 80% strength methanol. The active fractions were combined, the methanol was distilled off *in vacuo* and the solution was lyophilized. 1.3 g. of substance of specific activity 2500 KIU/mg. were obtained (total activity: $3.22 \times 10^6$ KIU), representing a yield of 73.5%.

EXAMPLE 3

120 kg. of bovine lungs were digested with methanol/ $CaCl_2$ as described in Example 1. The methanol was carefully distilled from 400 liters of the clear filtrate obtained. The aqueous solution, containing the kallikrein-trypsin inhibitor in a crude form, was acidified with HCl to a pH value of 1.5 and charged onto a column of 8 liters of porous polystyrene resin of 150 m.$^2$ surface area per g. (Ca. 9255). Total activity: $152 \times 10^6$ KIU. The column was washed with 16 liters of 0.01 N HCl, 16 liters of 0.02 M EDTA and 10 liters of distilled $H_2O$. Thereafter, the active substance was eluted with a linear gradient of 20 liters of distilled water and 20 liters of 80% strength methanol. The fractions which contained the active substance were combined, the methanol was distilled off and the solution was lyophilized. 25.7 g. of solids of specific activity 4200 KIU/mg. were obtained (total activity $108 \times 10^6$ KIU), corresponding to a yield of 71%.

EXAMPLE 4

120 g. of bovine lungs, digested with methanol/calcium chloride according to Example 1, after removal of the methanol, adjustment of the pH value to 1.5 and centrifuging yielded 67 ml. of supernatant liquid containing 150,000 KIU.

10 ml. of porous polystyrene resin (Lewapol Ca. 9255 with 150 m.$^2$ surface area per g.) were stirred into this crude solution of the inhibitor. After 30 minutes, the resin was suction-filtered off and washed with 100 ml. of water. Thereafter the resin was suspended in a solution of 20 ml. of isopropanol made up to 100 ml. with water, and stirred for 30 minutes. The resin was filtered off and the inhibitor in the filtrate was determined after distilling off the isopropanol *in vacuo*. Yield, 123,000 KIU, corresponding to 82% of the inhibitory capacity originally introduced.

While the invention has been described in detail above, it is apparent that it is capable of numerous modifications and embodiments without departing from the essential spirit and character thereof. Thus, the scope of the invention is not intended to be limited by the specific disclosure above but only as defined by the subjoined claims.

What is claimed is:

1. A process for the separation of kallikrein-trypsin inhibitor from an aqueous mixture, comprising adsorbing the said kallikrein-trypsin inhibitor onto a non-ionic, porous, cross-linked resin copolymer of styrene and divinylbenzene having an active surface area of 10 to 1000 m.$^2$/g., separating the remainder of the mixture from the resin, and eluting the inhibitor from the resin.

2. The process of claim 1 in which the inhibitor is adsorbed onto the resin at pH 1–3.

3. The process of claim 1 in which the resin is washed between adsorption and desorption with water, dilute hydrochloric acid, and a dilute aqueous solution of the sodium salt of ethylene diamine tetraacetic acid.

4. The process of claim 1 in which the inhibitor is eluted with an aqueous water miscible organic solvent.

5. The process of claim 1 in which the inhibitor is eluted with aqueous tri-ethylamine.

6. The process of claim 1 in which the aqueous mixture is derived from an extract of bovine organ tissue.

7. The process of claim 6 in which the extract was obtained by a process comprising digesting comminuted bovine organ tissue with an aqueous solution containing an alkali metal or alkaline earth metal hydroxide and an organic solvent, and in which the said organic solvent is removed from the mixture before the inhibitor is adsorbed on the resin.

8. The process of claim 7 in which the organic solvent is methanol.

9. The process of claim 6 in which the extract was obtained by a process comprising digesting comminuted bovine organ tissue with an aqueous carboxylic or mineral acid in the presence of ammonium sulphate.

10. The process of claim 6 in which the extract was obtained by a process comprising digesting comminuted bovine organ tissue with an aqueous carboxylic or mineral acid, and ammonium sulphate is added to the aqueous mixture before the inhibitor is adsorbed on the resin.

11. The process of claim 9 in which the ammonium sulphate is present in the aqueous mixture at 0.2 to 0.5 saturation at pH 1.0 to 2.5.

12. A process for the separation of kallikrein-inactivator, (KI), from aqueous mixtures containing the same which comprises contacting an aqueous mixture containing kallikrein-inactivator with a non-ionic, porous, cross-linked resin copolymer of styrene and divinylbenzene having an active surface area of from 10–1000 m.$^2$/g. to preferentially adsorb said kallikrein-inactivator onto said resin, separating the remainder of said aqueous mixture from said resin and eluting said kallikrein-inactivator from said resin, and wherein the resin, after contact with said aqueous mixture containing kallikrein-inactivator and separation of the remainder of said aqueous mixture, is washed with members of the group consisting of water, dilute aqueous mineral acids and dilute aqueous salt solutions.

13. The process of claim 12 wherein said aqueous mixture is maintained at a pH of from 1–3 while contacting said resin.

14. The process of claim 12 wherein the kallikrein-inactivator is eluted from the resin with an aqueous water-miscible organic solvent selected from the group consisting of methanol, ethanol, isopropanol and acetone.

15. The process of claim 4 wherein said aqueous water-miscible organic solvent contains ammonia as an additive.

References Cited

UNITED STATES PATENTS

| | | | |
|---|---|---|---|
| 3,558,773 | 1/1971 | Schultz | 260—112.5 |
| 3,308,026 | 3/1967 | Schultz | 260—112.5 |
| 3,300,384 | 1/1967 | Schultz | 260—112.5 |
| 3,181,997 | 5/1965 | Schultz | 260—112.5 |
| 2,890,986 | 6/1959 | Kraut et al. | 260—112.5 |

OTHER REFERENCES

Anderer et al.: Z. Naturforsch., 20B, 457 (1965).
Schultz, Chem. Abstr., 62, 3891f (1965).
Paskhina et al.: Chem. Abstr., 65, 7548c (1966).

ELBERT L. ROBERTS, Primary Examiner
REGINALD J. SUYAT, Assistant Examiner